US011159499B2

(12) United States Patent
Lew

(10) Patent No.: US 11,159,499 B2
(45) Date of Patent: Oct. 26, 2021

(54) CONVEYING ENCRYPTED ELECTRONIC DATA

(71) Applicant: salesforce.com, inc., San Francisco, CA (US)

(72) Inventor: Eugene Lew, Olney, MD (US)

(73) Assignee: salesforce.com, inc., San Francisco, CA (US)

( * ) Notice: Subject to any disclaimer, the term of this patent is extended or adjusted under 35 U.S.C. 154(b) by 340 days.

(21) Appl. No.: 16/263,460

(22) Filed: Jan. 31, 2019

(65) Prior Publication Data

US 2020/0252379 A1 Aug. 6, 2020

(51) Int. Cl.

*H04L 29/06* (2006.01)
*H04L 29/08* (2006.01)
*H04L 9/08* (2006.01)

(52) U.S. Cl.

CPC ........ *H04L 63/0485* (2013.01); *H04L 9/0827* (2013.01); *H04L 63/0471* (2013.01); *H04L 67/06* (2013.01); *H04L 67/1044* (2013.01); *H04L 67/327* (2013.01)

(58) Field of Classification Search

CPC ............... H04L 63/0485; H04L 67/327; H04L 67/1044; H04L 9/0827; H04L 63/0471; H04L 67/06

See application file for complete search history.

(56) References Cited

U.S. PATENT DOCUMENTS 6,266,704 B1 7/2001 Reed
7,590,245 B1 * 9/2009 Levitan .................. H04L 45/00 380/255
2009/0103734 A1 * 4/2009 Hammell ............. H04L 9/3252 380/278
2014/0283010 A1 * 9/2014 Rutkowski ............. H04L 9/088 726/18
2015/0012757 A1 * 1/2015 Binder ...................... G06F 7/58 713/190

(Continued)

OTHER PUBLICATIONS

Wikipedia, "Messaging Apps", https://en.wikipedia.org/wiki/Messaging_apps, printed Oct. 24, 2018, 8 pages.

(Continued)

*Primary Examiner* — Nicholas R Taylor
*Assistant Examiner* — Sanjoy Roy
(74) *Attorney, Agent, or Firm* — Butzel Long; Donald J. Lecher

(57) ABSTRACT

Electronic data can be conveyed. A processor of a first intermediate device can receive a first file. The processor can decrypt the first file to produce a second file. The second file can include a third file and an identification. The identification can be for a destination device. The third file can include the electronic data. The third file can be encrypted with respect to the first intermediate device. The processor can determine, based on the identification, a second intermediate device. The second intermediate device can be different from the destination device. The processor can produce a fourth file. The fourth file can include the third file and the identification. The processor can encrypt the fourth file to produce a fifth file. The processor can convey, to the second intermediate device, the fifth file.

20 Claims, 12 Drawing Sheets

(56) References Cited

U.S. PATENT DOCUMENTS

2015/0172168 A1* 6/2015 Picconi .................. H04L 45/64 709/241
2015/0281344 A1* 10/2015 Grootwassink ....... H04L 9/0827 713/168
2016/0112475 A1 4/2016 Lawson
2017/0099269 A1 4/2017 Robertson
2018/0309737 A1 10/2018 Jawaharlal
2018/0314723 A1 11/2018 Frantz, III

OTHER PUBLICATIONS

Wikipedia, “Multitenancy”, https://en.wikipedia.org/wiki/Multienancy, printed Oct. 24, 2018, 4 pages.
Wikipedia, “Onion Routing”, https://en.wikipedia.org/wiki/Onion_routing, printed Oct. 16, 2018, 4 pages.
Wikipedia, “OSI model”, https://en.wikipedia.org/wiki/OSI_model, prined Oct. 22, 2018, 6 pages.
Wikipedia, “Over-the-top media services”, https://en.wikipedia.org/wiki/Over-the-top_media_services, printed Oct. 16, 2018, 4 pages.
Wikipedia, “Session layer”, https://en.wikipedia.org/wiki/Session_layer, printed Oct. 22, 2018, 2 pages.
Wikipedia, “WhatsApp”, https://en.wikipedia.org/wiki/WhatsApp#End-to-end_encryption, printed Oct. 24, 2018, 20 pages.

* cited by examiner

CONVEYING ENCRYPTED ELECTRONIC DATA

BACKGROUND

The advancement of electronic communication network bandwidth capabilities in the last decade has enabled electronic data (e.g., an electronic message having alphabetic and numeric characters, voice data, or video data) to be conveyed from an electronic data transmission device to a recipient device directly rather than via a conventional controlled channel. Conveying electronic data in this manner can be referred to as over-the-top media distribution. Because conveyance of electronic data in an over-the-top media distribution manner has less control of the conveyance media than conveyance of electronic data via a conventional controlled channel, encryption of the electronic data can be important.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementation of the disclosed subject matter. No attempt is made to show structural details in more detail than may be necessary for a fundamental understanding of the disclosed subject matter and the various ways in which it can be practiced.

DETAILED DESCRIPTION

Figure 1:
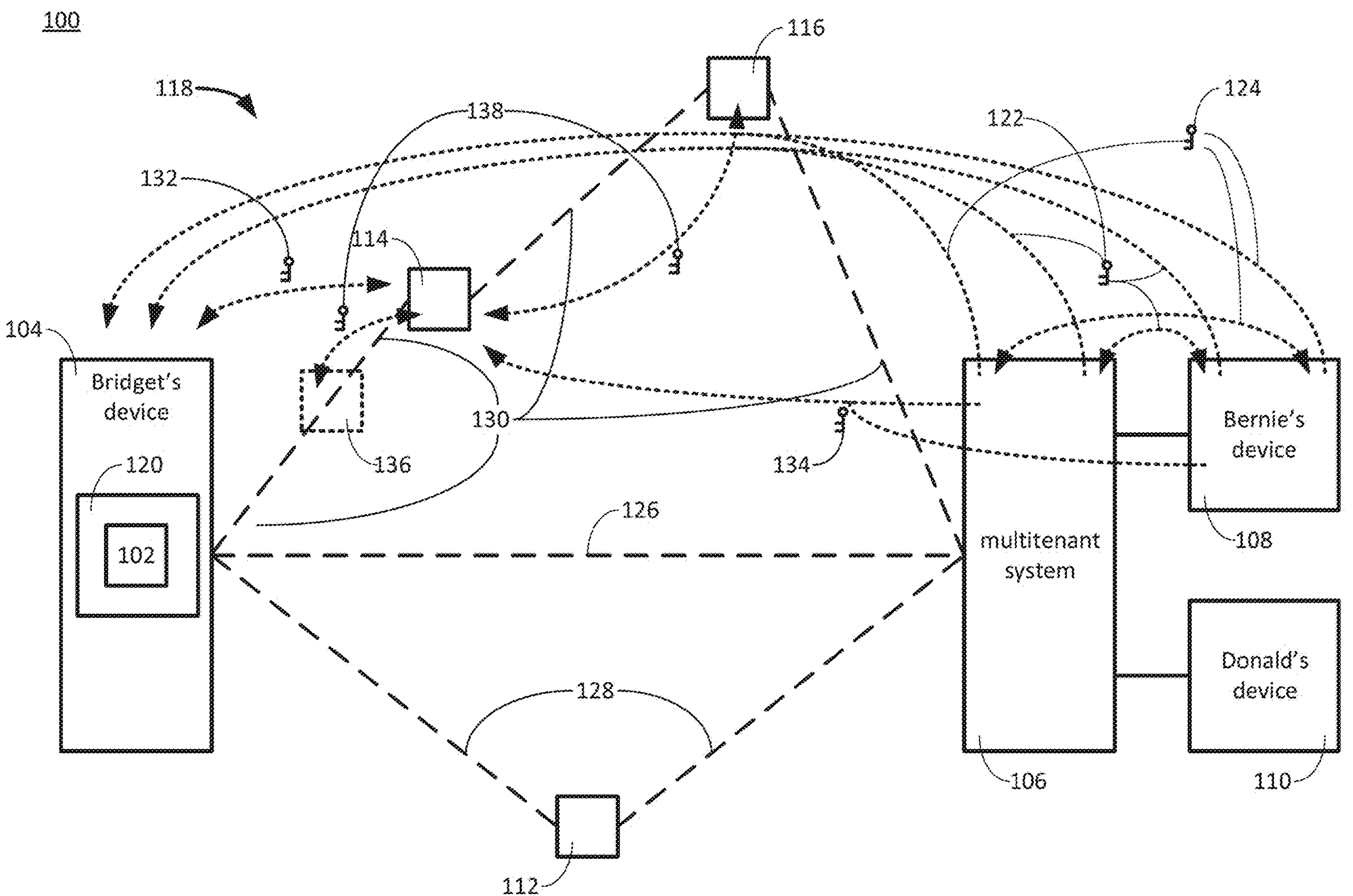
FIG. 1 is a diagram illustrating an example of an environment for conveying electronic data from a device outside a multitenant system via the multitenant system to a recipient device that is a tenant device associated with the multitenant system, according to the disclosed technologies.

As used herein, a statement that a component can be “configured to” perform an operation can be understood to mean that the component requires no structural alterations, but merely needs to be placed into an operational state (e.g., be provided with electrical power, have an underlying operating system running, etc.) in order to perform the operation.

The advancement of electronic communication network bandwidth capabilities in the last decade has enabled electronic data (e.g., an electronic message having alphabetic and numeric characters, voice data, or video data) to be conveyed from an electronic data transmission device to a recipient device directly rather than via a conventional controlled channel. Conveying electronic data in this manner can be referred to as over-the-top media distribution. Because conveyance of electronic data in an over-the-top media distribution manner has less control of the conveyance media than conveyance of electronic data via a conventional controlled channel, encryption of the electronic data can be important.

A technique for encryption of electronic data can also include encryption of a destination of a conveyance of the electronic data. The technique can include a conveyance of the electronic data from an electronic data transmission device to a recipient device via an intermediate device (e.g., a router) by: (1) first, producing a first file that includes an encryption of the electronic data and (2) second, producing a second file that includes the first file and an identification of a recipient device, and (3) third, producing a third file that includes an encryption of the second file. The electronic data transmission device can transmit the third file to the intermediate device. The intermediate device can receive the third file. The intermediate device can decrypt the third file to produce the second file. The intermediate device can, with the identification of the recipient device, transmit the first file to the recipient device. The recipient device can receive the first file. The recipient device can decrypt the first file to produce the electronic data. Encryption of the destination of the conveyance of the electronic data in this manner can be referred to as onion routing.

Additionally, the development of the Internet has allowed for computing resources to be distributed so that, for example, data can be sent, via the Internet, from a first location to a second location. At the second location, a computing resource can use the data to perform a function (using an application). A result of the function can be sent, via the Internet, from the second location to the first location. This, in turn, has led to the emergence of cloud computing in which an application, traditionally performed by computing resources of an organization (e.g., at the first location), can be performed by computing resources of a third party (e.g., at the second location). More recently, such third party cloud computing organizations have developed multitenancy software architecture so that a single instance of an application operating on a computing resource (e.g., a server of a multitenant system) of a cloud computing organization can perform the function of the application for multiple client organizations (e.g., tenants). Multitenancy software architecture can be configured so that a first tenant generally does not have access to proprietary data of a second tenant, and vice versa.

However, with respect to a conveyance of electronic data from an electronic data transmission device outside of a multitenant system to a tenant device associated with the multitenant system, conventional onion routing techniques consider the multitenant system itself, not the tenant device, to be the recipient device. As a result, using conventional onion routing techniques, the multitenant system, not the tenant device, decrypts the final file to produce the unencrypted electronic data before transmitting the unencrypted electronic data to the tenant device.

FIG. 1 is a diagram illustrating an example of an environment 100 for conveying electronic data 102 from a device 104 outside a multitenant system 106 via the multitenant system 106 to a recipient device that is a tenant device 108 associated with the multitenant system 106, according to the disclosed technologies. The environment 100 can include, for example, the device 104, the multitenant system 106, the tenant device 108, a tenant device 110, an intermediate device 112, an intermediate device 114, and an intermediate device 116. Devices in the environment 100 can be communicably connected by a network 118. The electronic data 102 can include, for example, one or more of an electronic message having alphabetic and numeric characters, voice data, video data, or the like. The multitenant system 106 can include, for example, a multitenant database system. The network 118 can include, for example, one or more of a packet switched network, a peer-to-peer network, a cellular network, or the like. For illustrative purposes herein, the device 104 can be associated with Bridget, the tenant device 108 can be associated with Bernie, the tenant device 110 can be associated with Donald, and the electronic data 102 can be the electronic message "Bridget loves Bernie, not Donald."

Device Outside the Multitenant System

Figure 2:
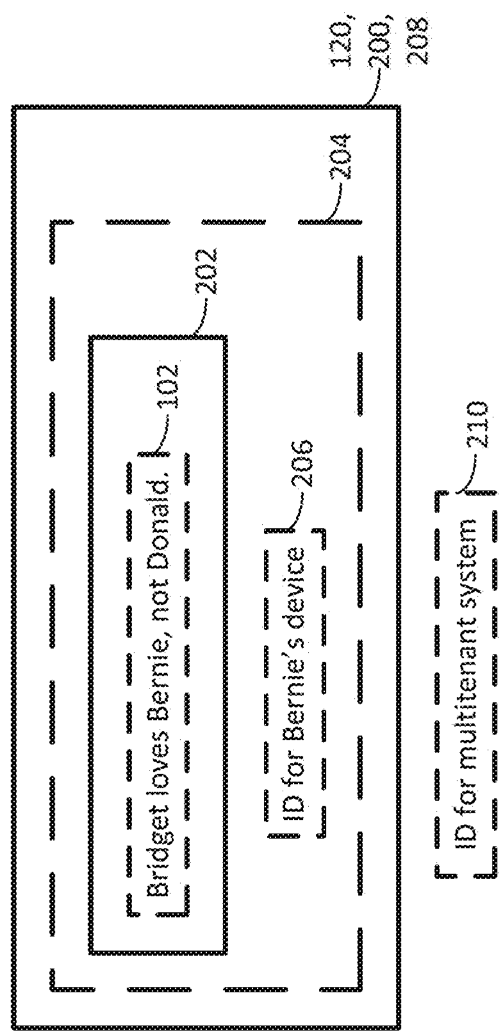
FIG. 2 is a diagram illustrating an example of a first version of a file for transmission, according to the disclosed technologies.

The device 104 can be configured to transmit, to the multitenant system 106, a file for transmission 120. FIG. 2 is a diagram illustrating an example of a first version 200 of the file for transmission 120, according to the disclosed technologies.

With reference to FIGS. 1 and 2, the device 104 can be configured to encrypt the electronic data 102 (e.g., "Bridget loves Bernie, not Donald.") to produce a first file. For example, the first file can be a file 202. Optionally, the device 104 can be configured to receive, from a recipient device for the electronic data 102, a first key. For example, the first key can be a key 122. The first key can be used to encrypt the electronic data 102. For example, the recipient device can be the tenant device 108 (e.g., Bernie's device). Alternatively, optionally, the device 104 can be configured to receive, from the multitenant system 106, the first key.

The device 104 can be configured to produce a second file. The second file can include the first file and a first identification. The first identification can be for the recipient device (e.g., the tenant device 108 (e.g., Bernie's device)). For example, the second file can be a file 204. For example, the first identification can be an identification 206.

The device 104 can be configured to encrypt the second file to produce a third file. For example, the third file can be a file 208. Optionally, the device 104 can be configured to receive, from the multitenant system 106, a second key. For example, the second key can be a key 124. The second key can be used to encrypt the second file. Alternatively, optionally, the device 104 can be configured to receive, from the recipient device, the second key.

The device 104 can be configured to transmit, to the multitenant system 106, the first version 200 of the file for transmission 120. The first version 200 of the file for transmission 120 can include the third file. The multitenant system 106 can be configured to communicate with the recipient device (e.g., the tenant device 108 (e.g., Bernie's device)). For example, the device 104 may transmit, through a first signal path 126, the first version 200 of the file for transmission 120 directly to the multitenant system 106.

Figure 3:
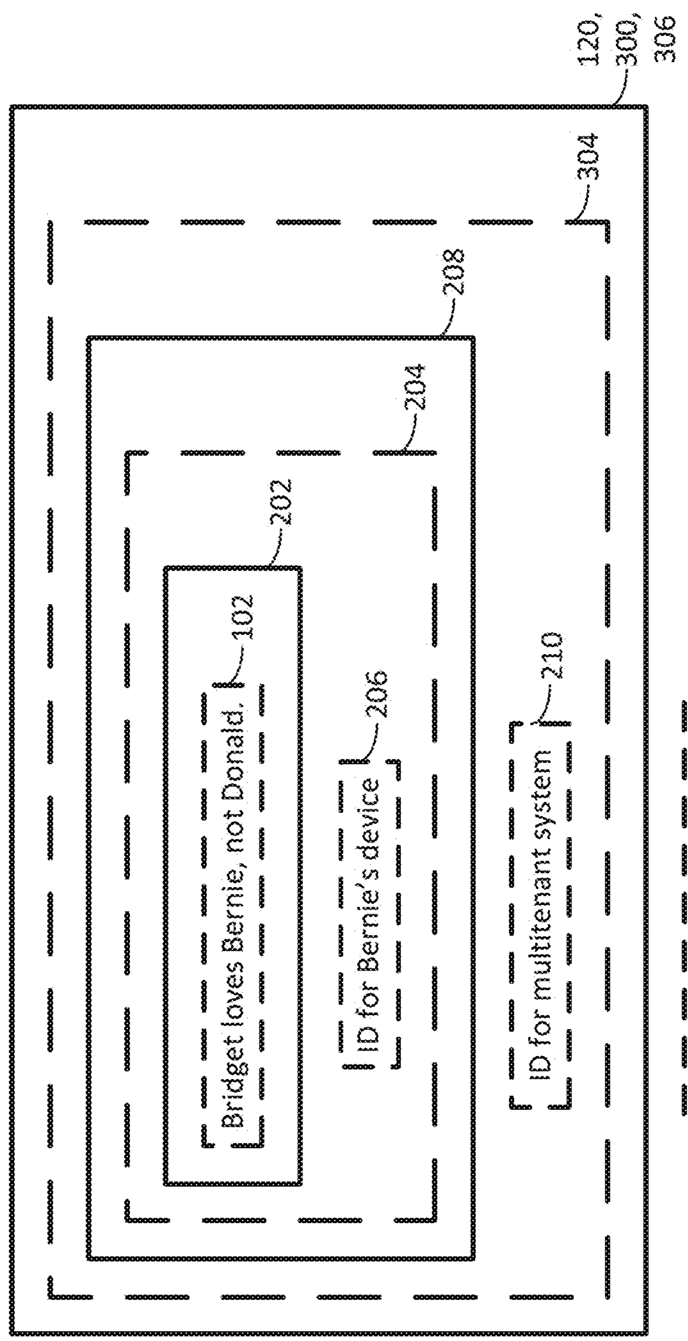
FIG. 3 is a diagram illustrating an example of a second version of the file for transmission, according to the disclosed technologies.

FIG. 3 is a diagram illustrating an example of a second version 300 of the file for transmission 120, according to the disclosed technologies.

With reference to FIGS. 1 and 3, in a first optional configuration, the device 104 can be further configured to determine an intermediate device to be used to convey the second version 300 of the file for transmission 120 from the device 104 to the multitenant system 106. For example, the intermediate device can be the intermediate device 112. For example, the device 104 can be configured to determine the intermediate device 112 without using information in a routing table or a routing policy. Additionally or alternatively, for example, the device 104 can be configured to determine a signal path from the device 104 to the multitenant system 106. The signal path can be for the second version 300 of the file for transmission 120. For example, the signal path can be a signal path 128. For example, the device 104 can be configured to determine the intermediate device 112 based on the signal path 128.

Optionally, the device 104 can be further configured to produce a fourth file. The fourth file can include the third file and a second identification. The second identification can be for the multitenant system 106. For example, the fourth file can be a file 304. For example, the second identification can be an identification 210.

Optionally, the device 104 can be further configured to encrypt the fourth file to produce a fifth file. For example, the fifth file can be a file 306.

Optionally, the device 104 can be configured to transmit, to the multitenant system 106 via the intermediate device 112, the second version 300 of the file for transmission 120. The second version 300 of the file for transmission 120 can be the fifth file.

Figure 4:
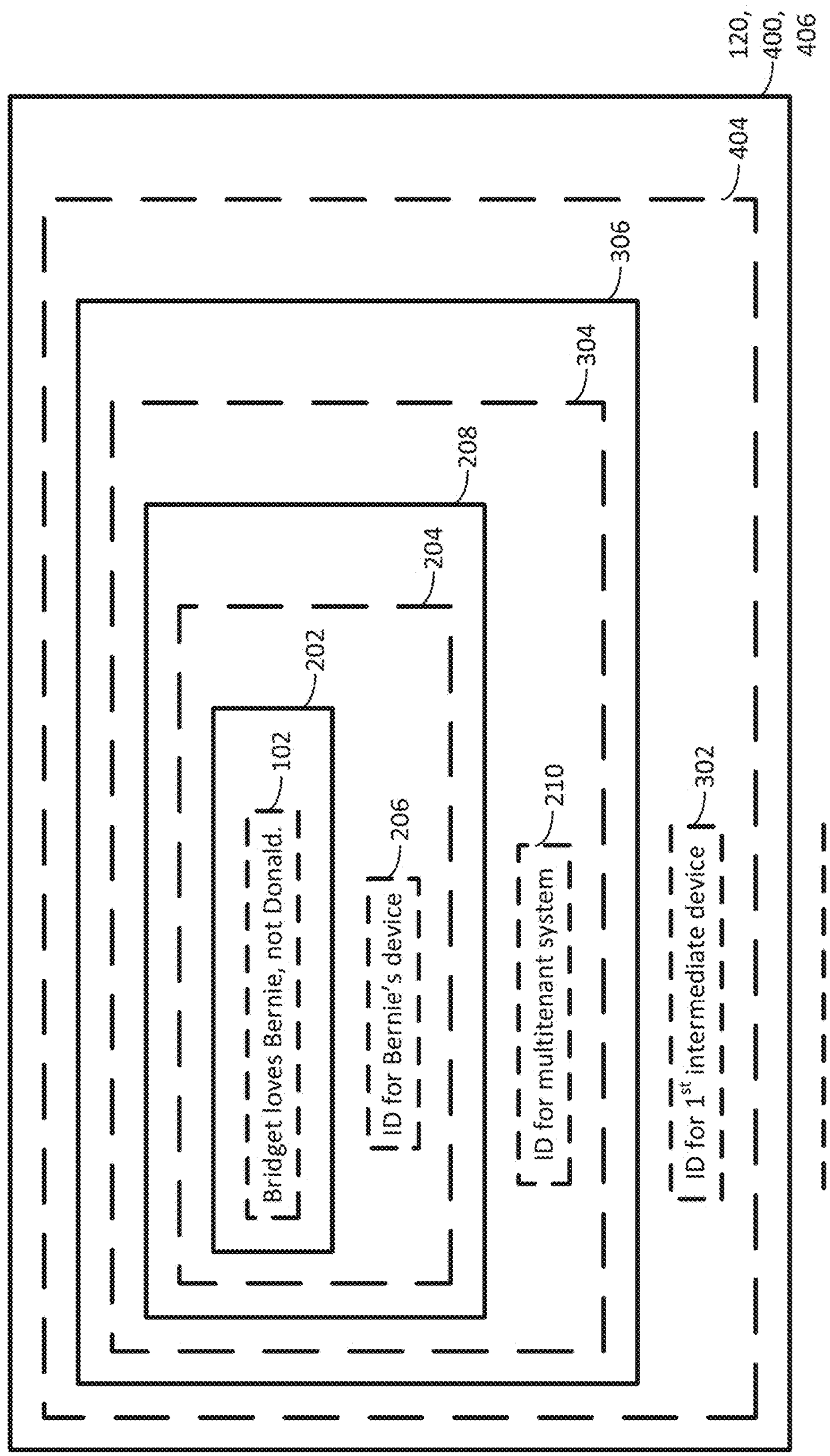
FIG. 4 is a diagram illustrating an example of a third version of the file for transmission, according to the disclosed technologies.

FIG. 4 is a diagram illustrating an example of a third version 400 of the file for transmission 120, according to the disclosed technologies.

With reference to FIGS. 1 and 4, optionally, the device 104 can be further configured to determine another intermediate device to be used to convey the third version 400 of the file for transmission 120 from the device 104 to the multitenant system 106. For example, the intermediate device can be the intermediate device 114 and the other intermediate device can be the intermediate device 116. For example, the device 104 can be configured to determine the intermediate device 116 without using information in a routing table or a routing policy. Additionally or alternatively, for example, the device 104 can be configured to determine a signal path from the device 104 to the multitenant system 106. The signal path can be for the third version 400 of the file for transmission 120. For example, the signal path can be a signal path 130. For example, the device 104 can be configured to determine the intermediate device 116 based on the signal path 130.

Optionally, the device 104 can be further configured to produce a sixth file. The sixth file can include the fifth file and a third identification. The third identification can be for the intermediate device 114. For example, the sixth file can be a file 404. For example, the third identification can be an identification 302.

Optionally, the device 104 can be further configured to encrypt the sixth file to produce a seventh file. For example, the seventh file can be a file 406.

Optionally, the device 104 can be configured to transmit, to the multitenant system 106 via the intermediate device 114 and the intermediate device 116, the third version 400 of the file for transmission 120. The second version 400 of the file for transmission 120 can be the seventh file.

In a second optional configuration, the device 104 can be configured to transmit the file for transmission 120 without predetermining all intermediate devices to be used to convey the file for transmission 120 from the device 104 to the multitenant system 106. Optionally, the device 104 can be further configured to determine, using a routing table or a routing policy, a first intermediate device to be used to convey the file for transmission 120 from the device 104 to the multitenant system 106. For example, the first intermediate device can be the intermediated device 114. Optionally, the device 104 can be further configured to determine a portion of a signal path from the device 104 to the multitenant system 106. The portion of the signal path can be for the file for transmission 120. For example, the signal path can be the signal path 130. Optionally, the device 104 can be further configured to determine, based on the portion of the signal path, a second intermediate device to be used to convey the file for transmission 120 from the device 104 to the multitenant system 106. For example, the signal intermediate device can be the intermediate device 116.

Multitenant System

With reference to FIGS. 1 and 2, the multitenant system 106 can be configured to receive a first file. The first file can be from the device 104. For example, the first file can be the first version 200 of the file for transmission 120.

The multitenant system 106 can be configured to decrypt the first file to produce a second file. The second file can include a third file and an identification. The identification can be for the recipient device (e.g., the tenant device 108 (e.g., Bernie's device)). The third file can include the electronic data 102. The third file can be encrypted with respect to the multitenant system 106. For example, the second file can be the file 204. For example, the third file can be the file 202. For example, the identification can be the identification 206.

The multitenant system 106 can be configured to convey, to the recipient device, the third file. For example, the recipient device can be the tenant device 108 (e.g., Bernie's device).

Optionally, the multitenant system 106 can be configured to transmit, to the device 104, a first key. The first key can be used, by the device 104, to encrypt the second file to produce the first file. For example, the first key can be the key 124. Additionally and optionally, the multitenant system 106 can receive, from the recipient device (e.g., the tenant device 108 (e.g., Bernie's device)), the first key. For example, according to one technique, the recipient device (e.g., the tenant device 108 (e.g., Bernie's device)) can control one or more keys used to encrypt the electronic data 102 to be received by the recipient device (e.g., the tenant device 108 (e.g., Bernie's device)). According to this technique, the recipient device can transmit the first key to the multitenant system 106 and the multitenant system 106 can transmit the first key to the device 104.

Optionally, the multitenant system 106 can be configured to transmit, to the device 104, a second key. The second key can be used, by the device 104, to encrypt the electronic data 102 to produce the third file. For example, the second key can be the key 122. For example, according to one technique, the multitenant system 106 can control one or more keys used to encrypt the electronic data 102 to be conveyed to a tenant device (e.g., the tenant device 108 (e.g., Bernie's device)) of the multitenant system 106 via the multitenant system 106. Additionally and optionally, the multitenant system 106 can receive, from the recipient device (e.g., the tenant device 108 (e.g., Bernie's device)), the second key. For example, according to one technique, the recipient device (e.g., the tenant device 108 (e.g., Bernie's device)) can control one or more keys used to encrypt the electronic data 102 to be received by the recipient device (e.g., the tenant device 108 (e.g., Bernie's device)). According to this technique, the recipient device can transmit the second key to the multitenant system 106 and the multitenant system 106 can transmit the second key to the device 104.

For example, the multitenant system 106 can be a multitenant database system.

Recipient Device/Tenant Device

With reference to FIGS. 1 and 2, a recipient device can be a tenant device associated with the multitenant system 106 (e.g., the tenant device 108 (e.g., Bernie's device)). The recipient device can be configured to receive, from the multitenant system 106, a first file. The first file can be encrypted with respect to the multitenant system 106. The recipient device can be configured to decrypt the file to produce the electronic data 102. For example, the first file can be the file 202.

Optionally, the recipient device can be configured to transmit, to the device 104, a first key. The first key can be used, by the device 104, to encrypt the electronic data 102 to produce the first file. For example, the first key can be the key 122. Additionally and optionally, the recipient device can receive, from the multitenant system 106, the first key. For example, according to one technique, the multitenant system 106 can control one or more keys used to encrypt the file to be received by the multitenant system 106. According to this technique, the multitenant system 106 can transmit the first key to the recipient device and the recipient device can transmit the first key to the device 104.

Optionally, the recipient device can be configured to transmit, to the device 104, a second key. The second key can be used, by the device 104, to encrypt a second file to produce a third file. The second file can include the first file and an identification. The identification can be for the recipient device (e.g., the tenant device 108 (e.g., Bernie's device)). For example, the second key can be the key 124. For example, the second file can be the file 204. For example, the third file can be the file 208. For example, the identification can be the identification 206. For example, according to one technique, the recipient device (e.g., the tenant device 108 (e.g., Bernie's device)) can control one or more keys used to encrypt the electronic data 102 to be received by the recipient device (e.g., the tenant device 108 (e.g., Bernie's device)). Additionally and optionally, the recipient device can receive, from the multitenant system 106, the second key. For example, according to one technique, the multitenant system 106 can control one or more keys used to encrypt the file to be received by the multitenant system 106. According to this technique, the multitenant system 106 can transmit the second key to the recipient device and the recipient device can transmit the second key to the device 104.

Intermediate Devices

First Alternative Technique

In a first alternative technique, the file for transmission 120 can be conveyed from the device 104 to the multitenant system 106 through a signal path that can be predetermined. With reference to FIGS. 1 and 4, the intermediate device 114 can be configured to receive a first file. The first file can be from the device 104. For example, the first file can be the third version 400 of the file for transmission 120.

The intermediate device 114 can be configured to decrypt the first file to produce a second file. The second file can include a third file and a first identification. The first identification can be for another intermediate device (e.g., the intermediate device 116). The third file can include the electronic data 102. The third file can be encrypted with respect to the other intermediate device (e.g., the intermediate device 116). For example, the second file can be the file 404. For example, the third file can be the file 306. For example, the first identification can be the identification 302.

The intermediate device 114 can be configured to convey, to the other intermediate device (e.g., the intermediate device 116), the third file.

The other intermediate device (e.g., the intermediate device 116) can be configured to receive the third file.

The other intermediate device (e.g., the intermediate device 116) can be configured to decrypt the third file to produce a fourth file. The fourth file can include a fifth file and a second identification. The second identification can be for the multitenant system 106. The fifth file can include the electronic data 102. The fifth file can be encrypted with respect to the multitenant system 106. For example, the fourth file can be the file 304. For example, the fifth file can be the file 208. For example, the second identification can be the identification 210.

Optionally, the intermediate device 114 can be configured to transmit, to the device 104, a first key. The first key can be used, by the device 104, to encrypt the second file to produce the first file. For example, the first key can be a key 132.

Optionally, the intermediate device 116 can be configured to transmit, to the device 104, a second key. The second key can be used, by the device 104, to encrypt the fourth file to produce the third file. For example, the second key can be a key 138.

Second Alternative Technique

In a second alternative technique, the file for transmission 120 can be conveyed from an origination device to a destination device without predetermining all intermediate devices to be used to convey the file for transmission 120 from the origination device to the destination device. For example, the origination device can be the device 104. For example, the destination device can be the multitenant system 106. Alternatively, the destination device can be a recipient device that is a tenant device associated with the multitenant system 106. For example, the recipient device can be the tenant device 108 (e.g., Bernie's device).

With reference to FIGS. 1 and 3, a first intermediate device (e.g., the intermediate device 114) can be configured to receive a first file. For example, the first file can be the file 208 (or the file 306). Optionally, a file was encrypted using a first technique to produce the first file.

The first intermediate device can be configured to decrypt the first file to produce a second file. The second file can include a third file and a first identification. The third file can include the electronic data 102. The third file can be encrypted with respect to the first intermediate device. The first identification can be for the destination device. For example, the second file can be the file 204 (or the file 304). For example, the third file can be the file 202 (or the file 208). For example, the first identification can be the identification 206 (or the identification 210). For illustrative purposes herein, the destination device can be the tenant device 108 (e.g., Bernie's device) (or the multitenant system 106).

The first intermediate device can be configured to determine, based on the first identification, a second intermediate device (e.g., the intermediate device 116). The second intermediate device can be different from the destination device. For example, the first intermediate device can determine, based on the first identification, the second intermediate device using information in one or more of a routing table, a routing policy, or the like.

The first intermediate device can be configured to produce a fourth file. The fourth file can include the third file and the first identification. For example, the fourth file can be the file 204 (or the file 304).

The first intermediate device can be configured to encrypt the fourth file to produce a fifth file. For example the fifth file can be the file 208 (or the file 306). Optionally, the first intermediate device can encrypt the fourth file using a second technique to produce the fifth file.

The first intermediate device can be configured to convey, to the second intermediate device, the fifth file.

Optionally, the fifth file may be not identical to the first file (e.g., the technique used to encrypt the file that produced the first file was different from the technique used to encrypt the fourth file).

Optionally, the fifth file can be identical to the first file (e.g., the technique used to encrypt the file that produced the first file was the same as the technique used to encrypt the fourth file).

Optionally, the third file (e.g., the file 208) can include a sixth file. The sixth file can include a seventh file and a second identification. The seventh file can include the electronic data 102. In a configuration, the destination device can include the multitenant system 106, the second identification can be for a tenant device associated with the multitenant system 106 (e.g., the tenant device 108 (e.g., Bernie's device)), and the multitenant system 106 can be configured to communicate with the tenant device. For example, the sixth file can be the file 204. For example the seventh file can be the file 202. For example, the second identification can be the identification 206.

Optionally, in a first variation, the first intermediate device (e.g., the intermediate device 112) can be configured to decrypt the first file to produce a sixth file. The sixth file can include a seventh file and a second identification. The seventh file can include the third file and the first identification. The second identification can be for the second intermediate device (e.g., the multitenant system 106). The first intermediate device (e.g., the intermediate device 112) can be configured to determine, based on the first identification and the second identification, the second intermediate device (e.g., the multitenant system 106). For example, although in the second alternative technique the file for transmission 120 can be conveyed from the origination device to the destination device without predetermining all intermediate devices to be used to convey the file for transmission 120 from the origination device to the destination device (e.g., using information in one or more of a routing table, a routing policy, or the like), using this first variation can allow one or more of the intermediate devices to be predetermined.

Alternatively and optionally, in a second variation, the second file can further include a second identification. The second identification can be for the second intermediate device.

Figure 5:
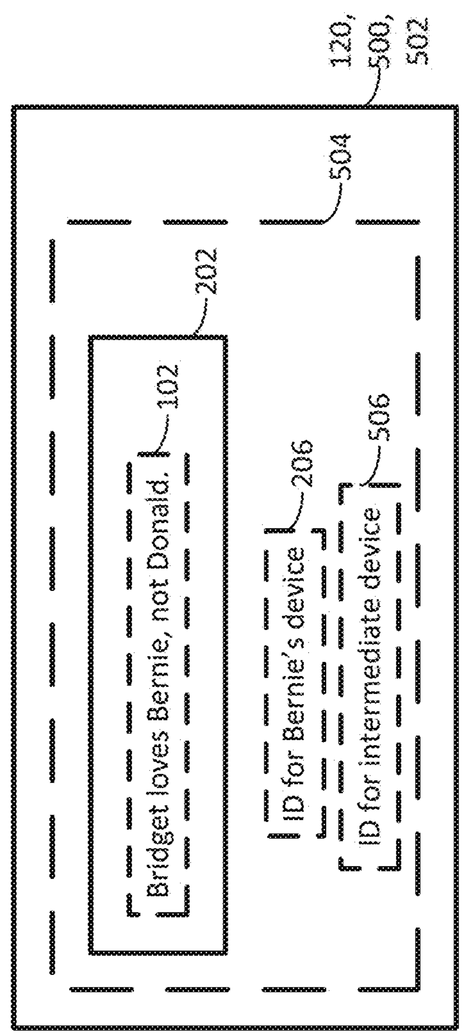
FIG. 5 is a diagram illustrating an example of a fourth version of the file for transmission, according to the disclosed technologies.

FIG. 5 is a diagram illustrating an example of a fourth version 500 of the file for transmission 120, according to the disclosed technologies.

With reference to FIGS. 1 and 5, optionally, the first intermediate device (e.g., the intermediate device 114) can be configured to determine, based on the first identification and the second identification, the second intermediate device (e.g., the intermediate device 116). For example, the first intermediate device can be configured to receive the first file.

For example, the first file can be the file 502. The first intermediate device can be configured to decrypt the first file to produce the second file. The second file can include the third file, the first identification, and the second identification. The third file can include the electronic data 102. The third file can be encrypted with respect to the first intermediate device. The first identification can be for the destination device. For example, the second file can be the file 504. For example, the third file can be the file 202. For example, the first identification can be the identification 206. For illustrative purposes herein, the destination device can be the tenant device 108 (e.g., Bernie's device). For example, the second identification can be the identification 506. For example, although in the second alternative technique the file for transmission 120 can be conveyed from the origination device to the destination device without predetermining all intermediate devices to be used to convey the file for transmission 120 from the origination device to the destination device (e.g., using information in one or more of a routing table, a routing policy, or the like), using this second variation can allow one or more of the intermediate devices to be predetermined.

Optionally, the first intermediate device can be configured to receive, from an origination device, a key. The origination device can be a device that did not receive the first file. For example, the origination device can be the device 104. For example, the key can be the key 132. The first intermediate device can be configured to decrypt, using the key, the first file.

Optionally, the first intermediate device can be configured to transmit, to an origination device, a key. The origination device can be a device that did not receive the first file. For example, the origination device can be the device 104. For example, the key can be the key 132. The key can enable the origination device to encrypt the second file.

Optionally, the first intermediate device can be configured to receive, from the destination device, a key. For example, the key can be a key 134. The first intermediate device can be configured to decrypt, using the key, the first file.

Optionally, the first intermediate device can be configured to receive, from a third intermediate device, a key. For example, the third intermediate device can be an intermediate device 136. Alternatively, the third intermediate device can be the second intermediate device (e.g., the intermediate device 116). For example, the key can be the key 138. The first intermediate device can be configured to decrypt, using the key, the first file.

Optionally, the first intermediate device can be configured to transmit, to a third intermediate device, a key. For example, the third intermediate device can be the intermediate device 136. Alternatively, the third intermediate device can be the second intermediate device (e.g., the intermediate device 116). For example, the key can be the key 138. The key can enable the third intermediate device (or the second intermediate device) to encrypt the second file.

For example, one or more of the first intermediate device, the second intermediate device, or the third intermediate device can be a router.

Method for Transmitting Electronic Data

Figure 6A:
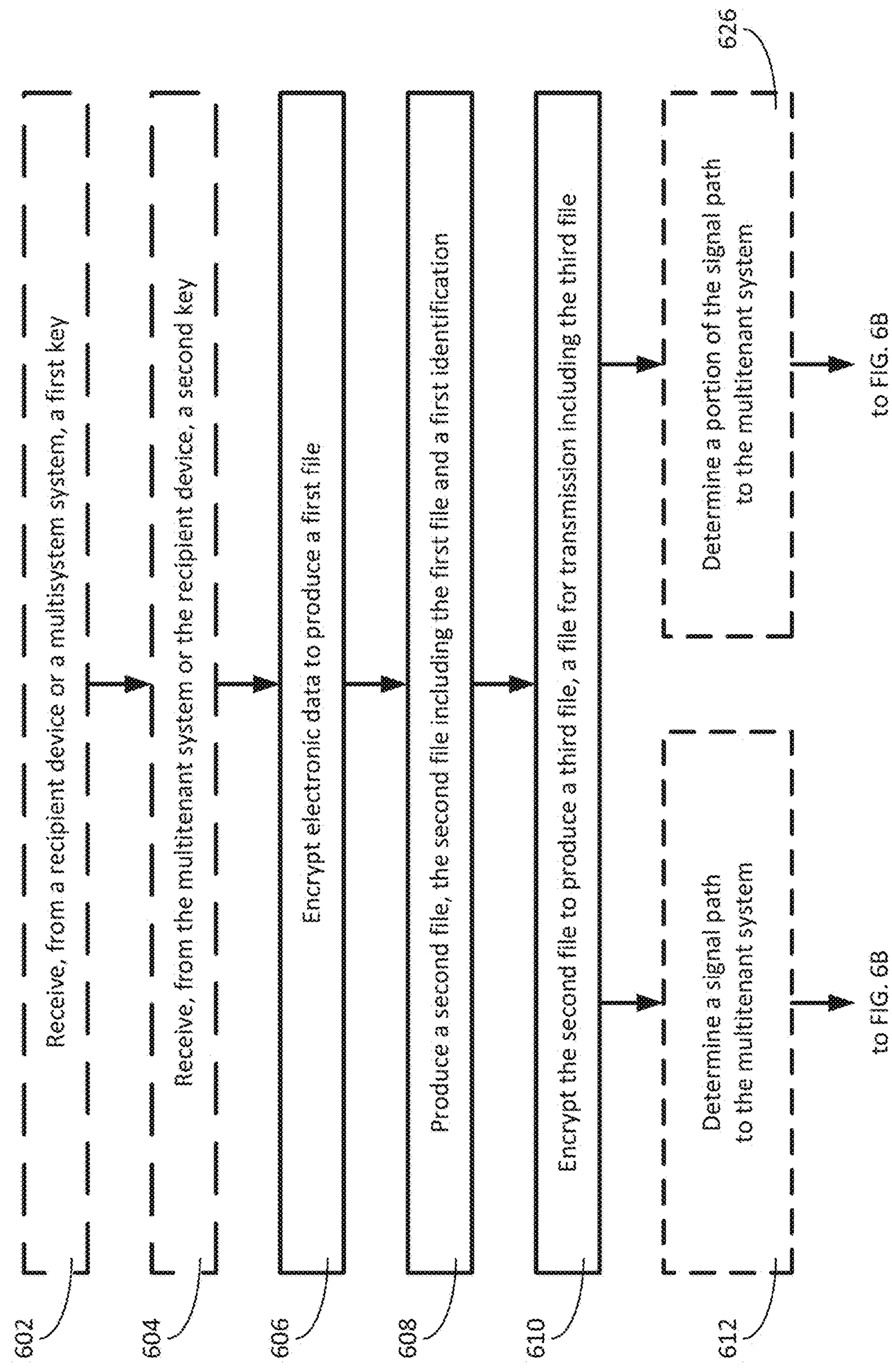
FIGS. 6A through 6C are a flow diagram illustrating an example of a method for transmitting electronic data from a device outside a multitenant system to a recipient device that is a tenant device associated with the multitenant system, according to the disclosed technologies.
Figure 6B:
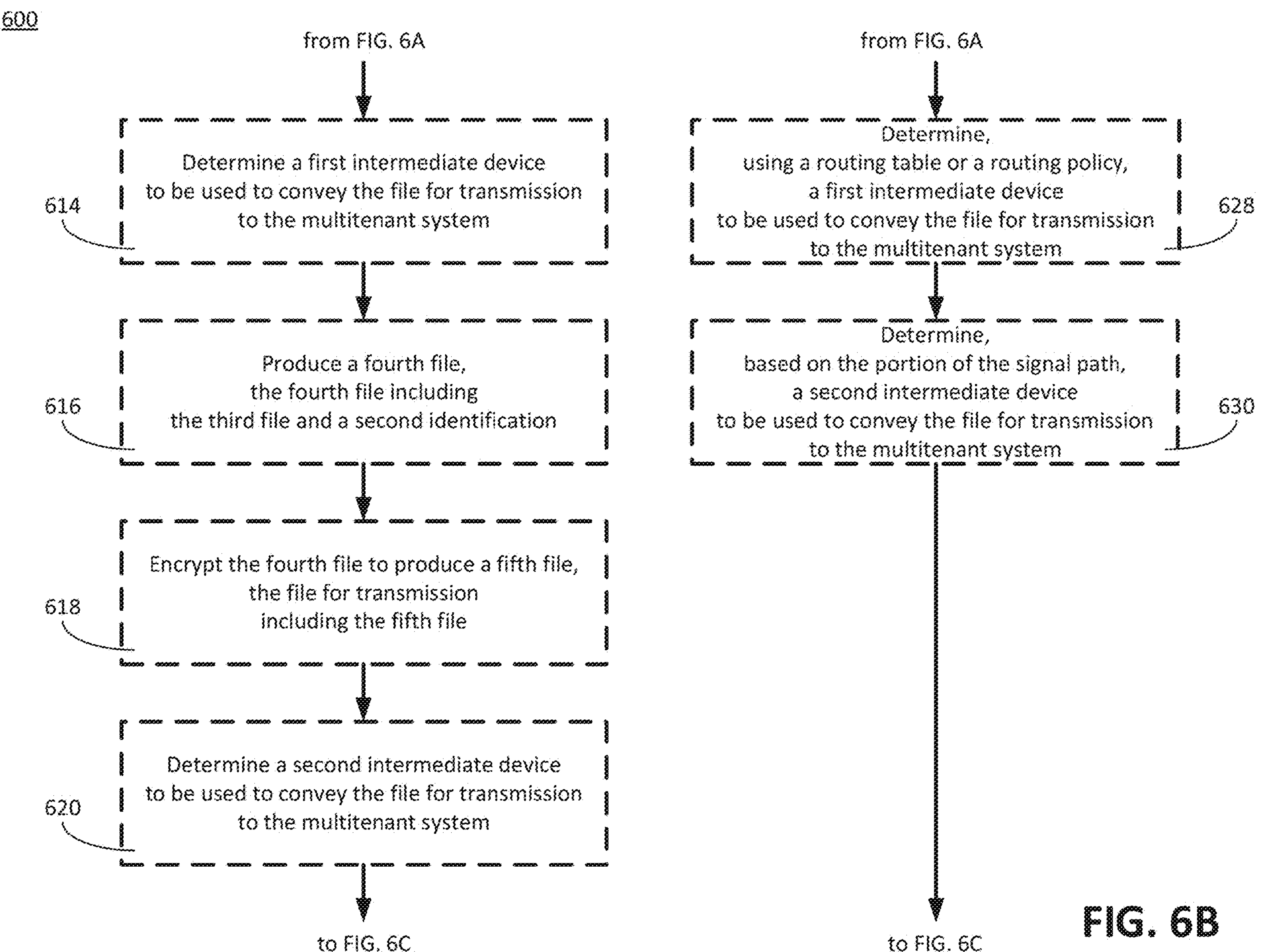
Figure 6C:
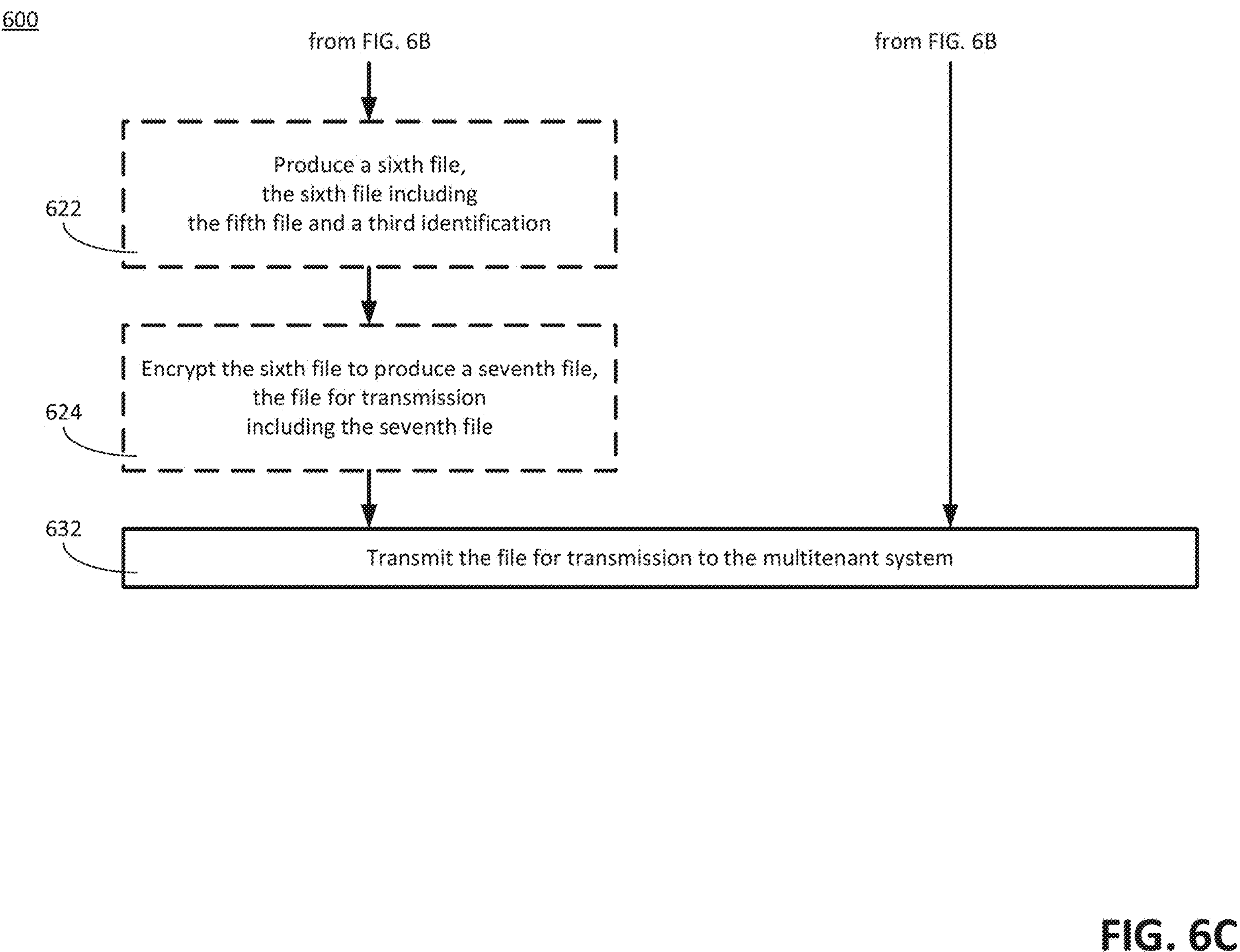

FIG. 6A through 6C are a flow diagram illustrating an example of a method 600 for transmitting electronic data from a device outside a multitenant system to a recipient device that is a tenant device associated with the multitenant system, according to the disclosed technologies. The electronic data can include, for example, one or more of an electronic message having alphabetic and numeric characters, voice data, video data, or the like.

With reference to FIG. 6A, in the method 600, at an optional operation 602, a processor of the device outside the multitenant system, can receive a first key. The first key can be used to encrypt the electronic data. The first key can be received from the recipient device or the multitenant system.

At an optional operation 604, the processor can receive a second key. The second key can be used to encrypt a file that includes the electronic data and an identification. The second key can be received from the multitenant system or the recipient device.

At an operation 606, the processor can encrypt the electronic data to produce a first file. For example, the processor can encrypt, using the first key, the electronic data to produce the first file.

At an operation 608, the processor can produce a second file. The second file can include the first file and a first identification. The first identification can be for the recipient device. The second file can be the file that includes the electronic data and the identification.

At an operation 610, the processor can encrypt the second file to produce a third file. For example, the processor can encrypt, using the second key, the second file to produce the third file. A file for transmission can include the third file. The file for transmission can be transmitted to the multitenant system. The multitenant system can be configured to communicate with the recipient device. The multitenant system can be identified by a second identification.

At an optional operation 612, the processor can determine a signal path from the processor to the multitenant system. The signal path can be for the file for transmission.

With reference to FIG. 6B, at an optional operation 614, the processor can determine a first intermediate device to be used to convey the file for transmission from the processor to the multitenant system. For example, the processor can determine the first intermediate device based on the signal path. Additionally or alternatively, for example, the processor can determine the first intermediate device without using a routing table, a routing policy, or the like.

At an optional operation 616, the processor can produce a fourth file. The fourth file can include the third file and the second identification. The second identification can be for the multitenant system.

At an optional operation 618, the processor can encrypt the fourth file to produce a fifth file. The file for transmission can include the fifth file.

At an optional operation 620, the processor can determine a second intermediate device to be used to convey the file for transmission from the processor to the multitenant system. For example, the processor can determine the second intermediate device based on the signal path. Additionally or alternatively, for example, the processor can determine the second intermediate device without using a routing table, a routing policy, or the like.

With reference to FIG. 6C, at an optional operation 622, the processor can produce a sixth file. The sixth file can include the fifth file and a third identification. The third identification can be for the first intermediate device.

At an optional operation 624, the processor can encrypt the sixth file to produce a seventh file. The file for transmission can include the seventh file.

The file for transmission can be transmitted without predetermining all intermediate devices to be used to convey the file for transmission from the processor to the multitenant system.

With reference to FIG. 6A, at an optional operation 626, the processor can determine a portion of the signal path from the processor to the multitenant system. The portion of the signal path can be for the file for transmission.

With reference to FIG. 6B, at an optional operation 628, the processor can determine, using a routing table, a routing policy, or the like, a first intermediate device to be used to convey the file for transmission from the processor to the multitenant system.

At an optional operation 630, the processor can determine, based on the portion of the signal path, a second intermediate device to be used to convey the file for transmission from the processor to the multitenant system.

With reference to FIG. 6C, at an operation 632, the processor can transmit the file for transmission to the multitenant system. For example, the processor can transmit the file for transmission through one or more of a packet switched network, a peer-to-peer network, or a cellular network. For example, the file for transmission can include the third file. For example, if the processor transmits the file for transmission to the multitenant system via the first intermediate device, then the file for transmission can include the fifth file. For example, if the processor further transmits the file for transmission to the multitenant system via the second intermediate device, then the file for transmission can include the seventh file.

First Method for Conveying Electronic Data

Figure 7:
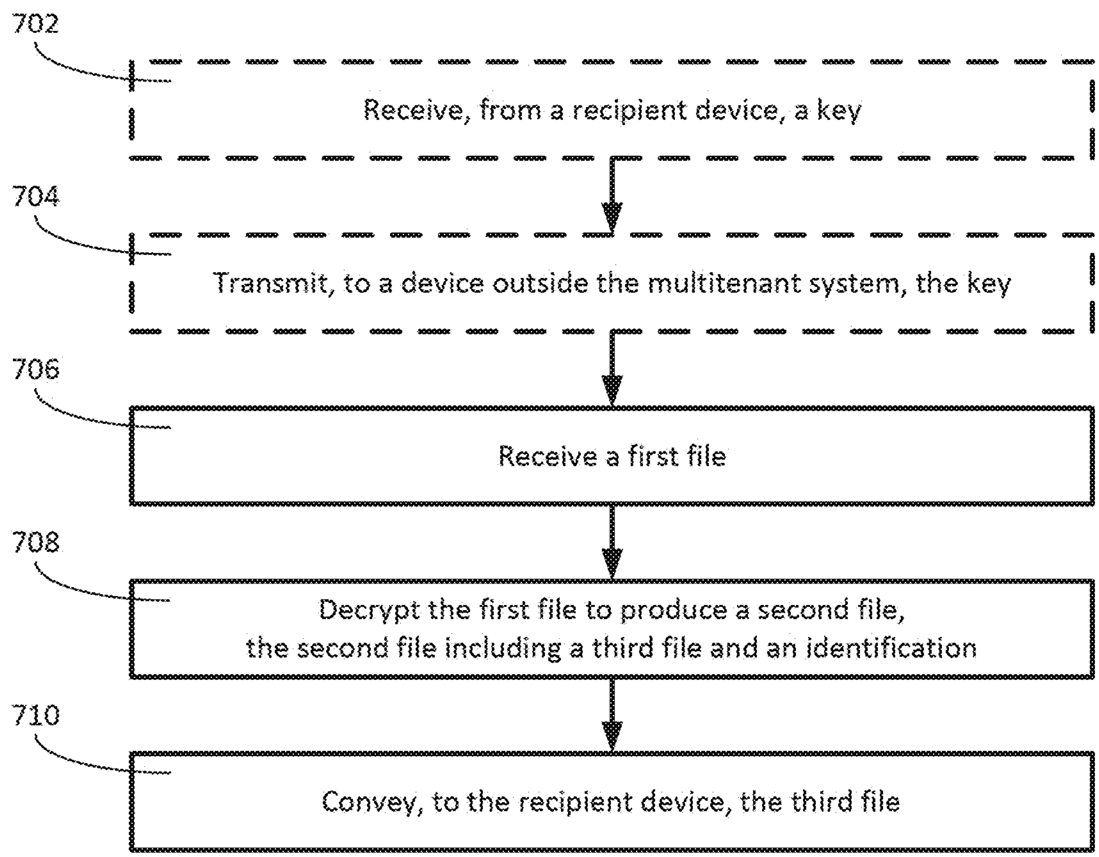
FIG. 7 is a flow diagram illustrating an example of a method for conveying electronic data from a device outside a multitenant system to a recipient device that is a tenant device associated with the multitenant system, according to the disclosed technologies.

FIG. 7 is a flow diagram illustrating an example of a method 700 for conveying electronic data from a device outside a multitenant system to a recipient device that is a tenant device associated with the multitenant system, according to the disclosed technologies. The electronic data can include, for example, one or more of an electronic message having alphabetic and numeric characters, voice data, video data, or the like.

In the method 700, at an optional operation 702, a processor of the multitenant system can receive, from the recipient device, a key. For example, the key can be used by the multitenant system to decrypt a file.

At an optional operation 704, the processor can transmit, to the device outside the multitenant system, the key. The key can enable the device outside the multitenant system to encrypt a file.

At an operation 706, the processor can receive a first file. The first file can be from the device outside the multitenant system. For example, the first file can be the file encrypted by the device outside the multitenant system.

At an operation 708, the processor can decrypt the first file to produce a second file. For example, the processor can use the key to decrypt the first file. The second file can include a third file and an identification. The identification can be for the recipient device. The third file can include the electronic data. The third file can be encrypted with respect to the multitenant system.

At an operation 710, the processor can convey the third file to the recipient device.

Second Method for Conveying Electronic Data

Figure 8A:
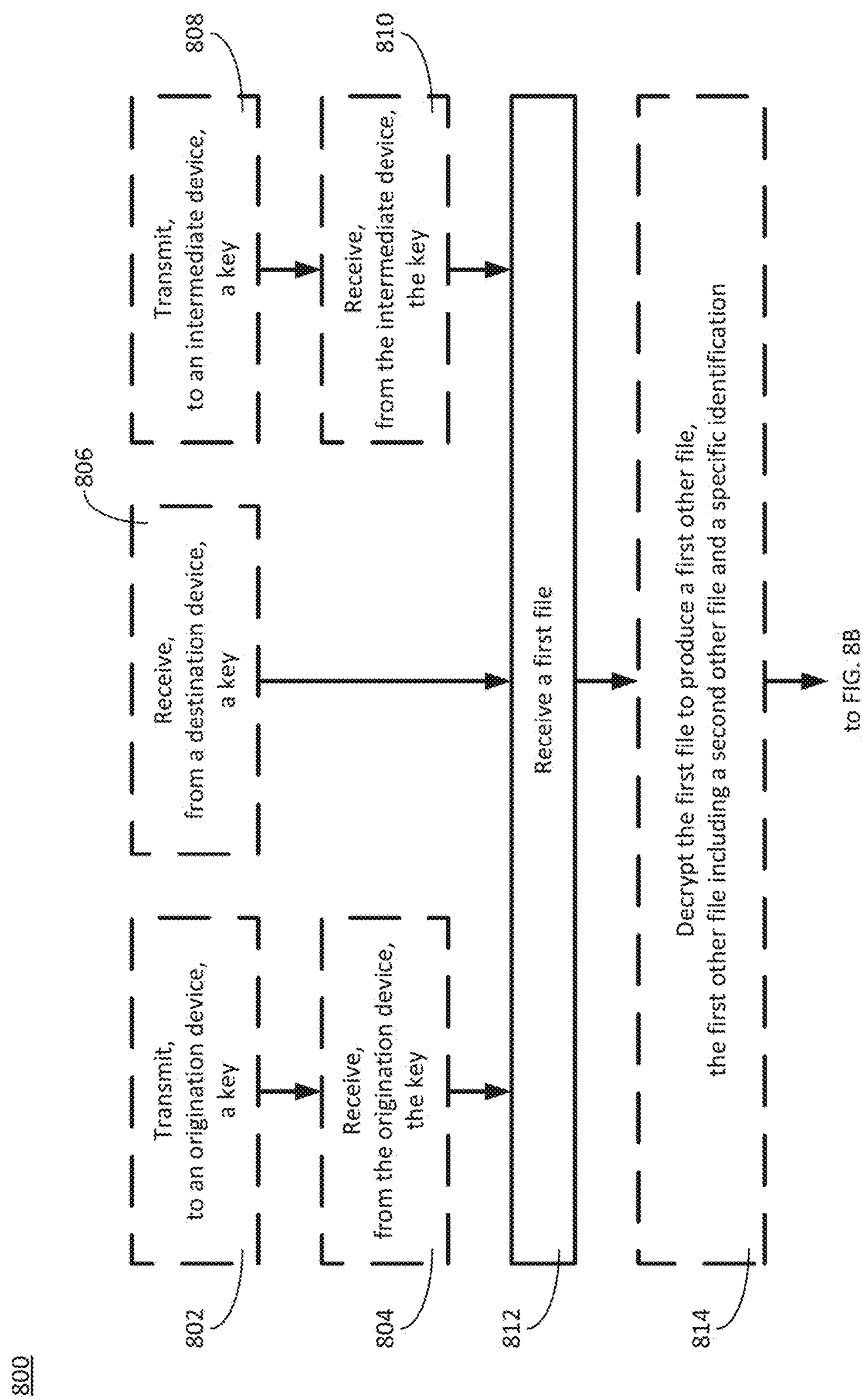
FIGS. 8A and 8B are a flow diagram illustrating another example of a method for conveying electronic data, according to the disclosed technologies.
Figure 8B:
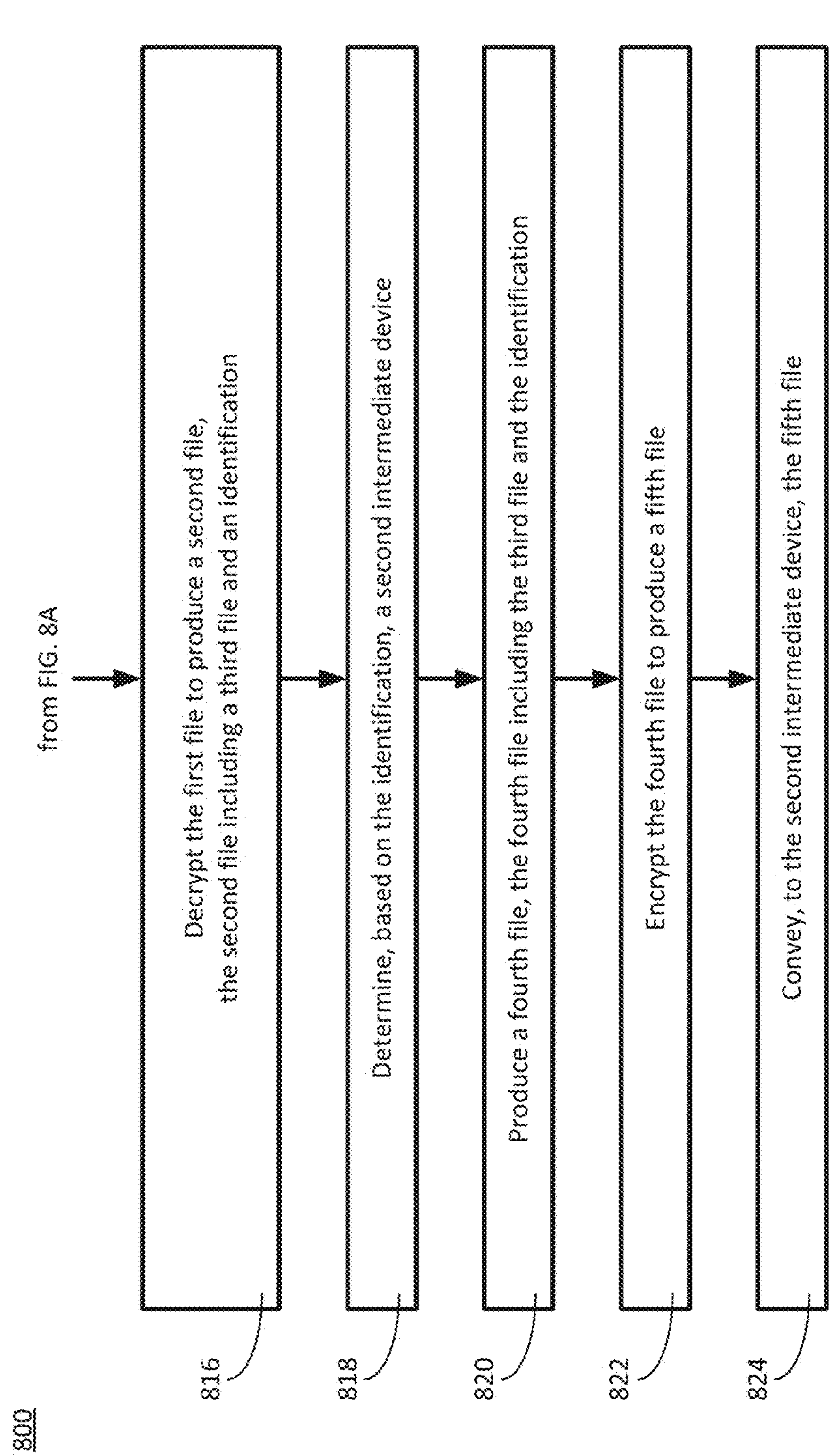

FIGS. 8A and 8B are a flow diagram illustrating another example of a method 800 for conveying electronic data, according to the disclosed technologies. The electronic data can include, for example, one or more of an electronic message having alphabetic and numeric characters, voice data, video data, or the like.

With reference to FIG. 8A, in the method 800, at an optional operation 802, a processor of a first intermediate device can transmit, to an origination device, a key. The key can enable the origination device to encrypt a file.

At an optional operation 804, the processor can receive, from the origination device, the key.

At an optional operation 806, the processor can receive, from a destination device, a key.

At an optional operation 808, the processor can transmit, to an intermediate device, a key. The key can enable the intermediate device to encrypt a file.

At an optional operation 810, the processor can receive, from the intermediate device, the key.

At an operation 812, the processor can receive a first file. In contrast, the origination device did not receive the first file.

At an optional operation 814, the processor can decrypt the first file to produce a first other file. The first other file can include a second other file and a specific identification. The specific identification can be for a second intermediate device. If the processor received the key from the intermediate device, then the intermediate device can be the second intermediated device. Alternatively, the intermediate device can be a third intermediate device. If the processor transmitted the key to the intermediate device, then the intermediate device can be the second intermediate device. Alternatively, the intermediate device can be the third intermediate device. The key can enable the intermediate device to encrypt the second file. Optionally, the first file can have been encrypted using a first technique.

With reference to FIG. 8B, at an operation 816, the processor can decrypt the first file to produce a second file. For example, the processor can decrypt the first file using the key. The second file can include a third file and an identification. The identification can be for the destination device. The third file can include the electronic data. The third file can be encrypted with respect to the first intermediate device. The destination device can include a tenant device associated with a multitenant system.

At an operation 818, the processor can determine, based on the identification, a second intermediate device. The second intermediate device can be different from the destination device.

If the processor decrypts the first file to produce the first other file, then the second other file can include the third file and the identification and the processor can determine the second intermediate device can be further based on the specific identification.

Alternatively, the third file can include a third other file and a second identification. The third other file can include the electronic data. The destination device can include the multitenant system. The second identification can be for a tenant device associated with the multitenant system. The third other file can be encrypted with respect to the multitenant system. The multitenant system can be configured to communicate with the tenant device.

Alternatively, the second file can include the second identification. The second identification can be for the second intermediate device. The processor can determine the second intermediate device further based on the second identification.

At an operation 820, the processor can produce a fourth file. The fourth file can include the third file and the identification.

At an operation 822, the processor can encrypt the fourth file to produce a fifth file. Optionally, the processor can encrypt the fourth file using a second technique. If the first file was encrypted using the first technique and the fifth file was encrypted using the second technique, then the fifth file can be not identical to the first file. Alternatively, the fifth file can be identical to the first file.

At an operation 824, the processor can convey, to the second intermediate device, the fifth file. For example, the processor can convey the fifth file through one or more of a packet switched network, a peer-to-peer network, a cellular network, or the like.

Although the description of the disclosed technologies are based on symmetric cryptography (i.e., the same key is used both for encryption and decryption), one of skill in the art understands that the disclosed technologies can also use asymmetric cryptography (i.e., one key used for encryption and a different key used for decryption).

Moreover, in general, in light of the technologies described above, one of skill in the art understands that conveying electronic data from a device outside a multi-tenant system to a recipient device that is a tenant device associated with the multitenant system can include any combination of some or all of the foregoing configurations.

Figure 9:
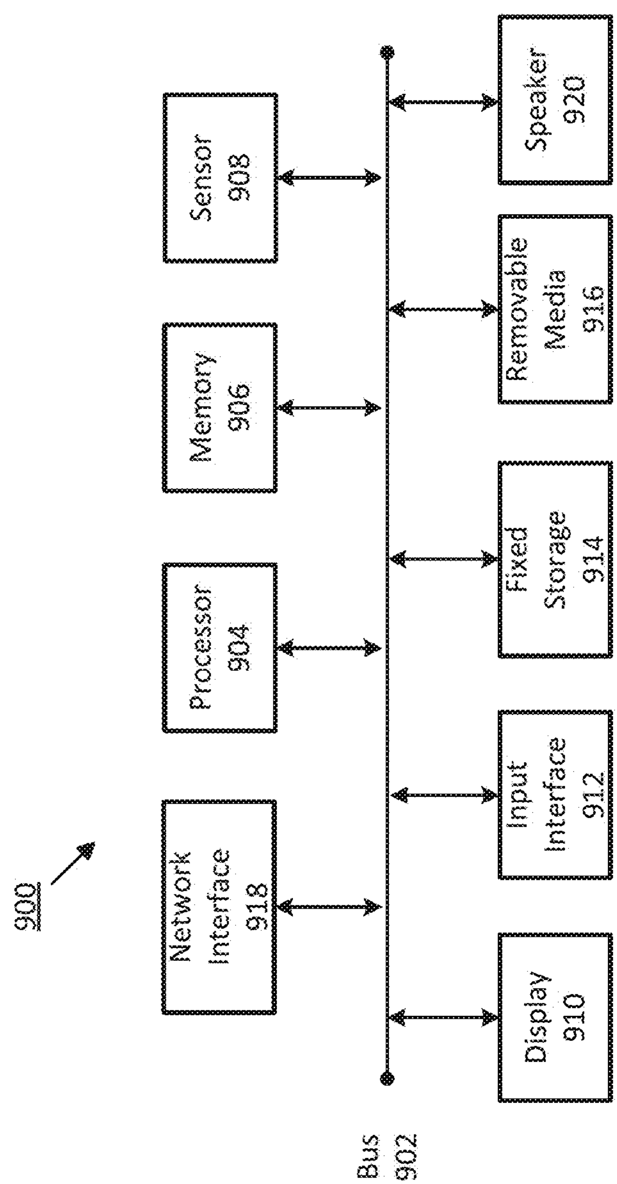
FIG. 9 is a block diagram of an example of a computing device suitable for implementing certain devices, according to the disclosed technologies.

FIG. 9 is a block diagram of an example of a computing device 900 suitable for implementing certain devices, according to the disclosed technologies. The computing device 900 can be constructed as a custom-designed device or can be, for example, a special-purpose desktop computer, laptop computer, or mobile computing device such as a smart phone, tablet, personal data assistant, wearable technology, or the like.

The computing device 900 can include a bus 902 that interconnects major components of the computing device 900. Such components can include a central processor 904, a memory 906 (such as Random Access Memory (RAM), Read-Only Memory (ROM), flash RAM, or the like), a sensor 908 (which can include one or more sensors), a display 910 (such as a display screen), an input interface 912 (which can include one or more input devices such as a keyboard, mouse, keypad, touch pad, turn-wheel, and the like), a fixed storage 914 (such as a hard drive, flash storage, and the like), a removable media component 916 (operable to control and receive a solid-state memory device, an optical disk, a flash drive, and the like), a network interface 918 (operable to communicate with one or more remote devices via a suitable network connection), and a speaker 920 (to output an audible communication). In some embodiments the input interface 912 and the display 910 can be combined, such as in the form of a touch screen.

The bus 902 can allow data communication between the central processor 904 and one or more memory components 914, 916, which can include RAM, ROM, or other memory. Applications resident with the computing device 900 generally can be stored on and accessed via a computer readable storage medium.

The fixed storage 914 can be integral with the computing device 900 or can be separate and accessed through other interfaces. The network interface 918 can provide a direct connection to the premises management system and/or a remote server via a wired or wireless connection. The network interface 918 can provide such connection using any suitable technique and protocol, including digital cellular telephone, WiFi™, Thread®, Bluetooth®, near field communications (NFC), and the like. For example, the network interface 918 can allow the computing device 900 to communicate with other components of the premises management system or other computers via one or more local, wide-area, or other communication networks.

The foregoing description, for purpose of explanation, has been described with reference to specific configurations. However, the illustrative descriptions above are not intended to be exhaustive or to limit configurations of the disclosed technologies to the precise forms disclosed. Many modifications and variations are possible in view of the above teachings. The configurations were chosen and described in order to explain the principles of configurations of the disclosed technologies and their practical applications, to thereby enable others skilled in the art to utilize those configurations as well as various configurations with various modifications as may be suited to the particular use contemplated.

The invention claimed is:

1. A method for conveying electronic data, the method comprising:

receiving, by a processor of a first intermediate device, a first file;

decrypting, by the processor, the first file to produce a second file, the second file including a third file, a first identification and a second identification, the first identification being for a recipient device, the second identification being for a destination device, the recipient device being a tenant device associated with the destination device, and the third file including the electronic data, the third file being encrypted with respect to the first intermediate device;

determining, by the processor and based on the second identification, a second intermediate device, the second intermediate device being different from the destination device;

producing, by the processor, a fourth file, the fourth file including the third file and the first identification;

encrypting, by the processor, the fourth file to produce a fifth file; and conveying, by the processor and to the second intermediate device, the fifth file.

2. The method of claim 1, wherein the electronic data comprise at least one of an electronic message having alphabetic and numeric characters, voice data, or video data.

3. The method of claim 1, wherein the conveying comprises conveying the fifth file through at least one of a packet switched network, a peer-to-peer network, or a cellular network.

4. The method of claim 1, wherein the fifth file is identical to the first file.

5. The method of claim 1, wherein:

the first file was encrypted using a first technique;

the encrypting the fourth file comprises encrypting, using a second technique, the fourth file; and the fifth file is not identical to the first file.

6. The method of claim 1, wherein the destination device comprises a tenant device associated with a multitenant system.

7. The method of claim 1, wherein the third file comprises a sixth file and the second identification, the sixth file including the electronic data.

8. The method of claim 7, wherein the destination device comprises a multitenant system, the second identification is for a tenant device associated with the multitenant system, the sixth file is encrypted with respect to the multitenant system, and the multitenant system is configured to communicate with the tenant device.

9. The method of claim 1, further comprising:

decrypting, by the processor, the first file to produce a sixth file, the sixth file including a seventh file and a third identification, the seventh file including the third file and the first identification, the third identification being for the second intermediate device;

wherein the determining the second intermediate device is further based on the third identification.

10. The method of claim 1, wherein:

the second file further includes a third identification, the third identification being for the second intermediate device; and the determining the second intermediate device is further based on the third identification.

11. The method of claim 1, further comprising:

receiving, by the processor and from an origination device, a key;

wherein:

the origination device did not receive the first file; and the decrypting the first file comprises decrypting, using the key, the first file.

12. The method of claim 1, further comprising:

transmitting, by the processor and to an origination device, a key, the key enabling the origination device to encrypt the second file;

wherein the origination device did not receive the first file.

13. The method of claim 1, further comprising:

receiving, by the processor and from the destination device, a key;

wherein the decrypting the first file comprises decrypting, using the key, the first file.

14. The method of claim 1, further comprising:

receiving, by the processor and from a third intermediate device, a key;

wherein the decrypting the first file comprises decrypting, using the key, the first file.

15. The method of claim 14, wherein the third intermediate device is the second intermediate device.

16. The method of claim 1, further comprising transmitting, by the processor and to a third intermediate device, a key, the key enabling the third intermediate device to encrypt the second file.

17. The method of claim 16, wherein the third intermediate device is the second intermediate device.

18. A non-transitory computer-readable medium storing computer code for controlling a processor of a first intermediate device to cause the processor to convey electronic data, the computer code including instructions to cause the processor to:

receive a first file;

decrypt the first file to produce a second file, the second file including a third file, a first identification and a second identification, the first identification being for a recipient device, the second identification being for a destination device, the recipient device being a tenant device associated with the destination device, and the third file including the electronic data, the third file being encrypted with respect to the first intermediate device;

determine, based on the second identification, a second intermediate device, the second intermediate device being different from the destination device;

produce a fourth file, the fourth file including the third file and the identification;

encrypt the fourth file to produce a fifth file; and convey, to the second intermediate device, the fifth file.

19. A first intermediate device for conveying electronic data, the first intermediate device comprising:

a memory configured to store a first file, a second file, a third file, a fourth file, and a fifth file; and a processor configured to:

receive a first file;

decrypt the first file to produce the second file, the second file including the third file, a first identification and a second identification, the first identification being for a recipient device, the second identification being for a destination device, the recipient device being a tenant device associated with the destination device, and the third file including the electronic data, the third file being encrypted with respect to the first intermediate device;

determine, based on the second identification, a second intermediate device, the second intermediate device being different from the destination device;

produce a fourth file, the fourth file including the third file and the first identification;

encrypt the fourth file to produce a fifth file; and convey, to the second intermediate device, the fifth file.

20. The first intermediate device of claim 19, wherein the first intermediate device comprises a router.

* * * * *